(12) United States Patent
Lin et al.

(10) Patent No.: US 11,108,523 B2
(45) Date of Patent: Aug. 31, 2021

(54) METHODS AND SYSTEMS FOR DETERMINATION OF TYPE OF SYSTEM INFORMATION

(71) Applicant: Telefonaktiebolaget LM Ericsson (publ), Stockholm (SE)

(72) Inventors: Zhipeng Lin, Nanjing (CN); Jingya Li, Gothenburg (SE); Pål Frenger, Linköping (SE); Andres Reial, Malmö (SE); Asbjörn Grövlen, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 56 days.

(21) Appl. No.: 16/480,274

(22) PCT Filed: Mar. 20, 2019

(86) PCT No.: PCT/CN2019/078894
§ 371 (c)(1),
(2) Date: Jul. 23, 2019

(87) PCT Pub. No.: WO2019/192319
PCT Pub. Date: Oct. 10, 2019

(65) Prior Publication Data
US 2021/0007085 A1 Jan. 7, 2021

(30) Foreign Application Priority Data
Apr. 6, 2018 (WO) ................ PCT/CN2018/082095

(51) Int. Cl.
*H04L 5/00* (2006.01)
*H04W 72/04* (2009.01)
*H04L 1/00* (2006.01)

(52) U.S. Cl.
CPC ......... *H04L 5/0053* (2013.01); *H04W 72/042* (2013.01); *H04L 1/0046* (2013.01); *H04L 1/0072* (2013.01)

(58) Field of Classification Search
CPC .......................... H04L 5/0053; H04W 72/042
See application file for complete search history.

(56) References Cited

U.S. PATENT DOCUMENTS

2013/0242947 A1 9/2013 Chen et al.
2017/0280477 A1* 9/2017 Martin .................... H04W 8/22
(Continued)

FOREIGN PATENT DOCUMENTS

| CN | 107659994 A | 2/2018 |
|---|---|---|
| WO | 2018064407 A1 | 4/2018 |

OTHER PUBLICATIONS

European Search Report and Search Opinion, EP App. No. 19740300.9, dated Jul. 17, 2020, 9 pages.
(Continued)

*Primary Examiner* — Kevin C. Harper
(74) *Attorney, Agent, or Firm* — Nicholson De Vos Webster & Elliott LLP

(57) ABSTRACT

The present disclosure introduces a method implemented at a user equipment. The method includes: determining, within a physical downlink control channel, one or more bits of a downlink control information that indicates a corresponding physical downlink shared channel carrying a remaining minimum system information or other system information. A user equipment and a corresponding network node are also introduced.

13 Claims, 15 Drawing Sheets

(56) References Cited

U.S. PATENT DOCUMENTS

| | | | |
|---|---|---|---|
| 2018/0098361 A1* | 4/2018 | Ji | H04L 5/0092 |
| 2019/0215101 A1* | 7/2019 | Ko | H04L 1/0061 |
| 2019/0223084 A1* | 7/2019 | John Wilson | H04L 5/0094 |
| 2019/0313434 A1* | 10/2019 | Zhou | H04W 48/12 |

OTHER PUBLICATIONS

LG Electronics, "Other System Information Delivery", 3GPP TSG RAN WG1 Meeting #92, R1-1802197, Feb. 26-Mar. 2, 2018, 3 pages.

Nokia et al., "Summary of QCL", 3GPP TSG RAN WG1#92, R1-1803328, Feb. 26-Mar. 2, 2018, 32 pages.

Potevio, "Remaining details on remaining minimum system information delivery", 3GPP TSG RAN WG1 Meeting 91, R1-1720376, Nov. 27-Dec. 1, 2017, 4 pages.

Samsung, "Summary on A.I. 7.1.2.3: Remaining details on other system information delivery", 3GPP TSG RAN WG1 Meeting AH 1801, R1-1801142, Jan. 22-26, 2018, 6 pages.

Vivo, "Remain details on other system information delivery", 3GPP TSG RAN WG1 Meeting #91, R1-1719761, Nov. 27-Dec. 1, 2017, 3 pages.

International Search Report and Written Opinion for Application No. PCT/CN2019/078894, dated Jun. 28, 2019, 9 pages.

International Preliminary Report on Patentability, PCT App. No. PCT/CN2019/078894, dated Oct. 15, 2020, 5 pages.

* cited by examiner

| Field | Bits | Comment |
|---|---|---|
| Identifier for DCI formats | 1 | Reserved |
| Frequency domain resource assignment | $\lceil \log_2(N_{RB}^{DL,BWP}(N_{RB}^{DL,BWP}+1)/2) \rceil$ | |
| Time domain resource assignment | 4 | Use default time allocation table |
| VRB-to-PRB mapping | 1 | |
| Modulation and coding scheme | [4] | Same MCS table as for "normal" transmission without 256QAM, only lowest part used. Only QPSK is used for SI |
| New data indicator | 1 | Reserved |
| Redundancy version | 2 | Reserved |
| HARQ process number | 4 | Reserved |
| Downlink assignment index | 2 | Reserved |
| TPC command for scheduled PUCCH | 2 | Reserved |
| PUCCH resource indicator | 3 | Reserved |
| PDSCH-to-HARQ_feedback timing indicator | 3 | Reserved |

Reserved DCI bits that may be utilized to indicate system information (SI) type

Figure 1A

METHODS AND SYSTEMS FOR DETERMINATION OF TYPE OF SYSTEM INFORMATION

CROSS-REFERENCE TO RELATED APPLICATIONS

This application is a National stage of International Application No. PCT/CN2019/078894, filed Mar. 20, 2019, which claims priority to International Application No. PCT/CN2018/082095, filed Apr. 6, 2018, which are hereby incorporated by reference.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

BACKGROUND

Resource Blocks

In 5G New Radio (NR) telecommunication scheme discussion, a user equipment (UE) can be configured with up to four carrier bandwidth parts in the downlink with a single downlink carrier bandwidth part being active at a given time. Similarly, a UE can be configured with up to four carrier bandwidth parts in uplink with a single uplink carrier bandwidth part being active at a given time. If a UE is configured with supplementary uplink, the UE can in addition be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Numerologies

Multiple OFDM numerologies, $\mu$, are supported in new radio (NR) as given by Table 1, where the subcarrier spacing, $\Delta f$, and the cyclic prefix for a carrier bandwidth part are configured by different higher layer parameters for downlink and uplink, respectively.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Supported transmission numerologies

Physical Channels

A downlink physical channel corresponds to a set of resource elements carrying information originating from higher layers. The following downlink physical channels are defined:

(1) Physical Downlink Shared Channel (PDSCH). The PDSCH is the main data bearing channel which is allocated to users on a dynamic and opportunistic basis. The PDSCH carries data in what's known as Transport Blocks (TB) which correspond to a MAC PDU. They are passed from the MAC layer to the PHY layer once per Transmission Time Interval (TTI).

(2) Physical Broadcast Channel (PBCH). The PBCH broadcasts a limited number of parameters essential for initial access of the cell such as downlink system bandwidth, the Physical Hybrid ARQ Indicator Channel structure, and the most significant eight-bits of the System Frame Number. These parameters are carried in what's called a Master Information Block. The PBCH is designed to be detectable without prior knowledge of system bandwidth and to be accessible at the cell edge.

(3) Physical Downlink Control Channel (PDCCH). The PDCCH carries the resource assignment for UEs, the resource assignment being contained in a Downlink Control Information (DCI) message. Multiple PDCCHs may be transmitted in the same subframe using Control Channel Elements (CCE) each of which is a nine set of four resource elements known as Resource Element Groups (REG) in one embodiment.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:

(1) Physical Uplink Shared Channel (PUSCH). This channel carries user data. In one embodiment, the PUSCH supports QPSK and 16 QAM modulation with 64 QAM being optional. Information bits are first channel-coded with a turbo code of mother rate of ⅓ before being adapted by a rate matching process for a final suitable code rate.

(2) Physical Uplink Control Channel (PUCCH). The PUCCH comprises uplink data transmitted independently of traffic data which include HARQ ACK/NACK, channel quality indicators (CQI), MIMO feedback (Rank Indicator, RI; Precoding Matrix Indicator, PMI) and scheduling requests for uplink transmission.

(3) Physical Random-Access Channel (PRACH). The PRACH carries the random-access preamble a wireless node (e.g., UE) sends to access the network in non-synchronized mode and used to allow the wireless node to synchronize timing with the network node (e.g., a base station).

That is, PUSCH is the uplink counterpart to the PDSCH; PUCCH is used by UEs to transmit uplink control information, including HARQ acknowledgements, channel state information reports, etc.; and PRACH is used for random access preamble transmission.

Cell Search and Initial Access Related Channels and Signals

For cell search and initial access, these channels are included: physical broadcast channel (PBCH) carried in SSB, PDSCH carrying remaining minimum system information/random access response/message 4 (RMSI/RAR/MSG4) scheduled by PDCCH channels carrying DCI, PRACH channels and PUSCH channel carrying message 3 (MSG3).

Synchronization signal and PBCH block (SS/PBCH block, or SSB in shorter format) comprises the above signals (PSS, SSS and PBCH DMRS), and PBCH. SSB may have 15 kHz, 30 kHz, 120 kHz or 240 kHz SCS depending on the frequency range.

Soft Combining

As RMSI may be repeating within the RMSI transmission time interval (TTI) (160 ms), soft combining can be used between the repetitions of PDSCHs carrying RMSI. For example, if the first PDSCH carrying RMSI is not able to be correctly decoded, and the second PDSCH cannot be correctly decoded either, the 2 versions of soft bits can be soft combined for further decoding, which is quite important to improve the performance of PDSCH carrying RMSI. This is also valid for other system information (OSI) when it is repeated within a period of time.

Cell Search and System Information Acquisition

Cell search is the procedure by which a UE acquires time and frequency synchronization with a cell and detects the physical layer Cell ID of that cell via primary synchronization signal (PSS)/secondary synchronization signal (SSS)/PBCH channels. When a UE starts to get access to a cell, it first searches the cell on an appropriate frequency, reads the associated system information block (SIB) information and then starts the random-access procedure to establish a radio resource control (RRC) connection.

A set of SIBs is defined. For example, a master information block (MIB) contain essential information required to receive further system information. A system information block type 1 (SIB1, or SIBType1) contains information on cell access and selection, and other SIB scheduling; SIB type 2 (SIB2, or SIBType2) contains radio resource configuration information; SIB type 3 (SIB3, or SIBType3) contains cell re-selection information for intra-frequency, inter-frequency. Similarly, other SIB types are defined. OSI is carried in the blocks of other SIB types except SIB1.

After decoding of PBCH, a UE may get information of control resource set (CORESET) configured by PBCH (also known as RMSI CORESET, or CORESET 0), in which there could be PDCCH with CRC scrambled by system information-radio network temporary identifier (SI-RNTI), random access RNTI (RA-RNTI), paging RNTI (P-RNTI), and etc.

For PDCCH with CRC scrambled by SI-RNTI in this CORESET, the corresponding PDSCH may carry RMSI or OSI, both of which are the system information that the UE will try to acquire. RMSI is required for initial access of a UE while OSI is other system information not required for the initial access.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to distinct different types of system information to be carried on a PDCCH, such as SIB1(RMSI) or SI message (OSI).

In a first aspect of the disclosure, a method at a wireless device for communication is provided. The method comprises identifying a physical downlink control channel (PDCCH) according to an obtained Control Resource Set (CORESET) configuration; receiving downlink control information (DCI) message on the identified PDCCH; determining, from the received DCI message, a scheduled physical downlink shared channel (PDSCH) on which system information is to be carried; and identifying a type of the system information according to one or more bits of the received DCI message. The one or more bits indicating the system information to be carried on the PDSCH is remaining minimum system information (RMSI) or other system information (OSI).

In an embodiment, the method further comprises decoding a physical broadcast channel from a signal received from a network node; and obtaining the CORESET configuration configured by the PBCH.

In an embodiment, the method further comprises receiving the system information carried on the PDSCH; in response that the system information is RMSI, decoding the RMSI; in response that there had been decoded RMSI in the wireless device, perform soft combining of RMSI; and establishing initial access with the network node based on the soft combined RMSI.

In an embodiment, the method further comprises receiving the system information carried on the PDSCH; in response that the system information is OSI, using the OSI in initial access to a network node from where the CORESET configuration is obtained, when a RMSI had been decoded.

In an embodiment, the received DCI message is under DCI format 1_0.

A second aspect of the disclosure, a method at a wireless device for communication is provided. The method comprises: receiving DCI message on a PDCCH, determining, from a received DCI message, a PDSCH on which system information is to be carried, determining, from the received DCI message, a type of the system information to be carried is RMSI or OSI; and determining whether to receive the system information to be carried on the PDSCH depending on the type of the system information to be carried.

In an embodiment, determining type of the system information to be carried is performed by determining number of soft bits of the system information to be carried according to the received DCI message. And in response that there had been decoded system information to be soft combined with the same determined number of soft bits, the wireless device determines that the type of decoded system information to be soft combined and the type of the system information to be carried are same. Then the system information to be carried is decided to be received and decoded for further soft combining.

In another embodiment, determining type of the system information to be carried is performed based on one or more bits included in the DCI message. The one or more bits indicate type of the system information to be carried on the PDSCH scheduled by the DCI message.

In a third aspect of the disclosure, a method at a network node is provided. The method comprises: broadcasting a CORESET configuration in which a PDCCH is indicated, transmitting a DCI message on the PDCCH, wherein the DCI message comprising scheduling information for a PDSCH carrying system information, and one or more bits indicating type of the system information to be carried on the PDSCH is RMSI or OSI, and transmitting the system information on the scheduled PDSCH.

In an embodiment, the network node transmits the DCI message under DCI format 1_0.

In an embodiment, the method further comprises scheduling transport block (TB) size for the system information transmission on PDSCH, wherein TB size of RMSI is different from TB size of OSI.

In a fourth aspect of the present disclosure, a wireless device is provided. The wireless device comprises an antenna configured for wireless communication, a processing circuitry, and a device readable medium including instructions which, when executed by the processing circuitry, cause the wireless device to perform any of the embodiments of the first and the second aspect of the disclosure.

In a fifth aspect of the present disclosure, a network node comprises an interface configured for wireless communication, a processing circuitry, and a device readable medium is provided. The device readable medium includes instructions which, when executed by the processing circuitry, cause the network node to perform any of the embodiments of the third aspect of the disclosure.

BRIEF DESCRIPTION OF THE DRAWINGS

FIG. 1A illustrates DCI fields may be used to indicate SI type according to some embodiments.

DETAILED DESCRIPTION

Figure 1B:
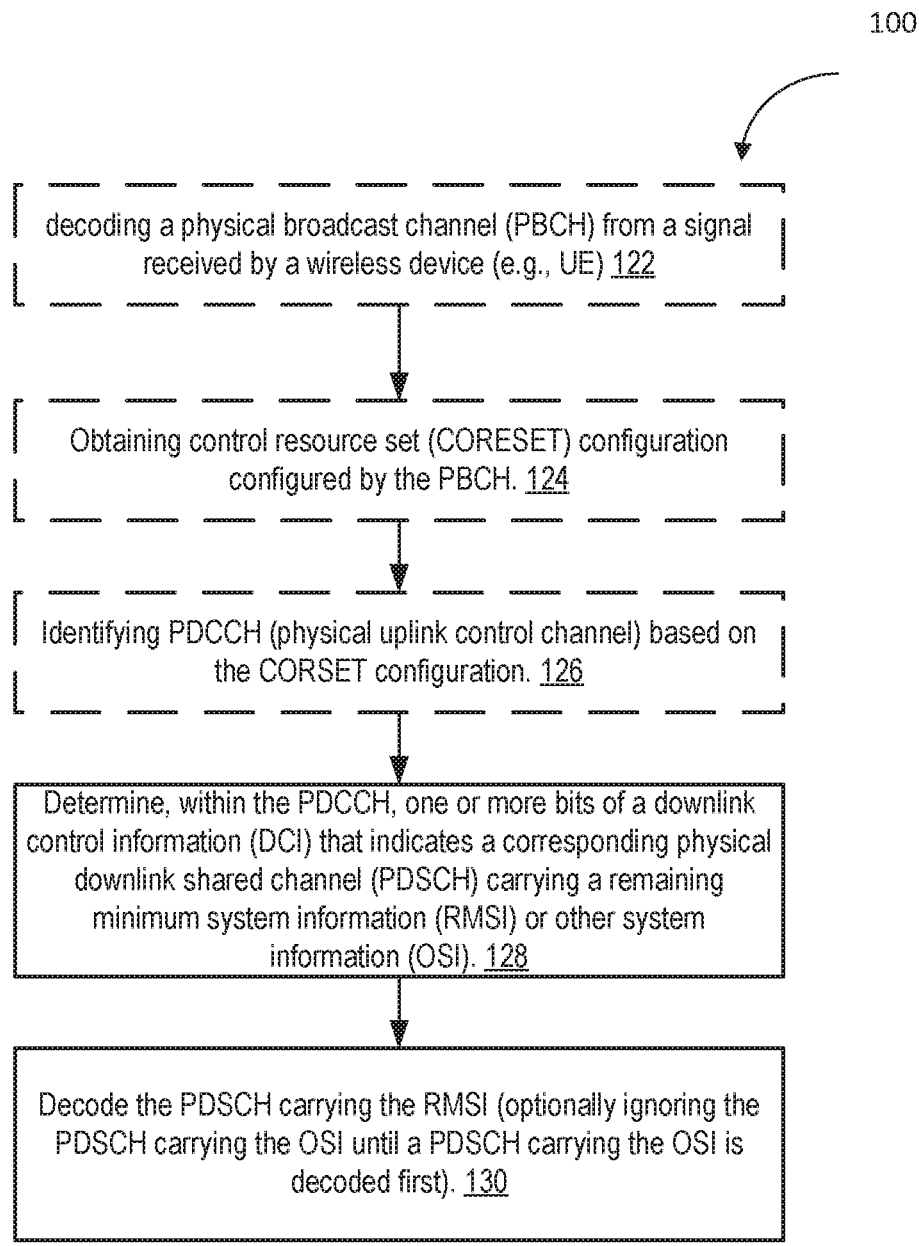
FIG. 1B illustrates some steps of decoding DCI fields indicating the SI according to some embodiments.

In long-term evolution (LTE), system information block type 1 (SIB1) is transmitted within subframe #5 with a repetition periodicity of 80 ms. The other system information (OSI) blocks can be transmitted in any subframe within time windows with well-defined starting points and durations. The starting point and duration of the time window of any system information (SI) are provided in SIB1. Note that in LTE, different SIs have different non-overlapping time windows. Thus, a device knows what type of SI is being received without the need for any specific identifier for each SI.

In NR, according to the current NR specification as discussed above, RMSI has a transmission time interval (TTI) of 160 ms during which there could be multiple RMSI repetitions that can be soft combined at the UE. Similarly, soft combining can be supported for OSI as well.

Before performing soft combining, UE needs to know whether it's OSI PDSCH (i.e. the PDSCH carrying OSI) or RMSI PDSCH (i.e. the PDSCH carrying RMSI), so that the PDSCHs carrying a same system information (SI) message type can be soft combined. Additionally, when a UE tries to decode PDSCH carrying RMSI or OSI, it needs information to know whether an RMSI is expected or OSI is expected. There is no mechanism in NR on how a UE can obtain the message type information carried by PDSCH scheduled by PDCCH with CRC scrambled by SI-RNTI. Based on the above mentioned situation, methods and/or systems are required to differentiate the RMSI PDSCH and OSI PDSCH.

Certain aspects of the present disclosure and their embodiments may provide solutions to these or other challenges. For example, some embodiments are provided to differentiate the RMSI PDSCH and OSI PDSCH, including the following:

1. Using reserved signaling bits or code points in DCI to indicate the system information type;
2. Defining different RNTI values for RMSI and OSI;
3. Adding signaling bits in RMSI and OSI payload in a fixed position to indicate the system information type;
4. Defining different CORSETs for PDCCH scheduling OSI and for PDCCH scheduling RMSI; and
5. The network schedules different transport block (TB) size or coding scheme for OSI and RMSI to make sure the numbers of soft bits are different for RMSI and OSI, so that UE will never soft combine OSI and RMSI.

There are, proposed herein, various embodiments which address one or more of the issues disclosed herein.

Additional Explanation

As discussed, the LTE solution for differentiating RMSI and OSI seems unnecessarily restrictive for NR, especially for higher frequencies, as it will require network to beam sweep the whole cell in one subframe for RMSI (SIB1) and then again for OSI (SI messages). It would be desirable to support scheduling SIB1 overlapping with at least one SI-window, therefore, the network can beam sweep the RMSI and OSI simultaneously. This is beneficial for analogue beamforming as well as for NR-unlicensed (NR-U) where the "beacons" must be kept as short as possible.

Based on current agreement in NR, the PDSCH carrying RMSI (SIB1) or OSI (SI messages) is scheduled by PDCCH with CRC scrambled by a same RNTI, i.e., SI-RNTI. Also, the CORESET configuration for PDCCH scheduling OSI is the same as for RMSI. Therefore, if the time monitoring window for PDCCH scheduling RMSI is overlapped with that for OSI, the UE will not be able to know whether the scheduled PDSCH contains SIB1 or OSI.

There might be two options to solve this issue:

Option 1: Use one reserved bit in DCI format 1_0 for indicating SIB/OSI when PDCCH is scrambled with RI-RNTI;

Option 2: Use separate SI-RNTIs for SIB1 (SIB1-RNTI) and OSI (SI-RNTI) transmission.

Option 1 requires decoding of PDCCHs to know whether it's OSI or RMSI.

Option 2 allows the UE to separate SIB1 transmission from SI message transmission, but does not increase the UE complexity, since a UE will never try to decode the two kinds of PDCCHs nor the corresponding PDSCH transport blocks simultaneously. The UE acquires first SIB1 and only afterwards start decoding OSI.

And given that it has been agreed in NR to support only one SI-RNTI, and not support scheduling of multiple SI messages in one window, there seems to be limited benefit in allowing SI-windows to overlap.

From UE point of view, overlapping windows might lead to potential error cases when the network schedules a SI message in the overlapping part. Using an example that SI window 1 partly overlaps with SI window 2, the network may transmit:

1. multiple HARQ redundancy versions of SI message 1 in SI window 1
2. multiple HARQ redundancy versions of SI message 2 in the overlapping part of SI window 2.

If the UE has not received SI message 1 correctly when the transmission of SI message 2 begins, it may erroneously combine it with a (re)transmission of SI message 2. Even though the NW may alleviate such issues to some extent by for example:

Not scheduling SI messages in the overlapping part (which effectively leads to non-overlapping windows)
Not using HARQ
Beamforming different SI messages to different directions in the overlapping part It's not clear that the benefits of overlapping windows overweight the increased complexity. Therefore, to support only one SI-RNTI, and not support scheduling of multiple SI messages in one window should not be agreed.

Assuming the above agreement has been revoked, and given the agreement to base the SI window on the LTE framework, we can use the LTE mapping to define the subframes/slots where SI messages are transmitted with only minor editorial modifications:

for the concerned SI message, determine the number n which corresponds to the order of entry in the list of SI messages configured by schedulingInfoList in si-SchedulingInfo in SIB1;
determine the integer value x=(n−1)*w, where w is the si-WindowLength;

the SI-window starts at the subframe #a, where a=x mod 10, in the radio frame for which SFN mod T=FLOOR (x/10), where T is the si-Periodicity of the concerned SI message.

In LTE, following subframes are excluded from SI window:
subframe #5 in radio frames for which SFN mod 2=0;
any MBSFN subframes;
any uplink subframes in TDD.

The first exclusion is caused by the restriction to schedule SIB1 in LTE in subframe #5 in even radio frames. The UE knows that is SI-RNTI is scheduled in subframe #5 in even radio frame, the corresponding RRC message is SIB1, while all other occurrences of SI-RNTI correspond to the SI message (defined by the SI-window).

Such a solution seems unnecessarily restrictive for NR, especially for higher frequencies, as it will require network to beam sweep the whole cell in one subframe for SIB1 and then again for SI messages. It would be desirable to be able to schedule SIB1 overlapping with at least one SI-window.

A simple alternative solution would be to use separate SI-RNTIs for SIB1 and SI message transmission. This allows the UE to separate SIB1 transmission from SI message transmission, but does not increase the UE complexity, as the UE will always acquire SIB1 first and only then start receiving the SI messages.

In LTE, the possibility to accumulate the SI-Message transmissions across several SI-Windows within the Modification Period was introduced for NB-IoT UEs: "The UE is not required to accumulate several SI messages in parallel but may need to accumulate a SI message across multiple SI windows, depending on coverage condition". On one hand, there is no strong need to support accumulation across multiple SI windows in NR Rel-15, but on the other hand, there is no strong need to prohibit it, either.

Some of the embodiments contemplated herein will now be described more fully. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Certain embodiments may provide one or more of the following technical advantage(s). For example, some embodiments provide methods, instructions/program, and/or systems to differentiate the RMSI PDSCH and OSI PDSCH, so that UE can know whether the PDSCH is for OSI or RMSI (e.g. when trying to do soft combing for RMSI or OSI).

The First Set of Embodiments

The first set of embodiments uses one or a few signaling bits in DCI for PDCCH with CRC scrambled with SI-RNTI to indicate the SI message type, i.e., whether the scheduled PDSCH carries OSI or RMSI.

In one embodiment, downlink control signaling is located at the start of each downlink subframe (e.g., up to the first three OFDM symbols). One of the advantages of transmitting control channel at the start of every subframe is if the UE is not scheduled it may turn off its receiver circuitry for larger part of the subframe which results in reduced power consumption. Downlink control signaling is carried by three physical channels. The Physical Control Format Indicator Channel (PCFICH) to indicate the number of OFDM symbols used for control signaling in this subframe, Physical Hybrid-ARQ Indicator Channel (PHICH) which carries downlink Acknowledgment (ACK)/Negative Acknowledgment (NACK) for uplink data transmission and Physical Downlink Common Control Channel (PDCCH) which carries the downlink scheduling assignment and uplink scheduling grants.

In one embodiment, the PDCCH carries scheduling assignments and other control information in the form of DCI messages. A PDCCH is transmitted on one control channel element (CCE) or an aggregation of several consecutive CCEs, where a CCE corresponds to 9 Resource Element Groups (REGs) in one embodiment. In PDCCH transmission, only those REGs are used which are not assigned to PCFICH or PHICH. Each REG contains 4 Resource Elements (REs). Thus, REGs are used for defining the mapping of control channels to resource elements.

The number of CCEs in a PDCCH transmission depends upon the PDCCH format, which can be 0, 1, 2, and 3 depending upon number of bits to be transmitted. In one embodiment, the PDCCH bits are created from a DCI message after performing CRC attachment, channel coding and rate matching. Multiple PDCCHs can be transmitted in a subframe thus the UE must monitor all PDCCH in given subframe control region. The DCI message transmits uplink or downlink scheduling information or an uplink Transmit Power Control (TPC) command. Depending on the purpose of control message, different DCI formats are defined. The information provided contains everything necessary for the UE to be able to identify the resources required to receive the Physical Downlink Data Channel (PDSCH) in that subframe and to decode it. The DCI format includes, for example, formats 0, is (1, 1A-1D), 2s (2, 2B-2D), 3, and 4.

In one embodiment, the RMSI and OSI DCI transmissions utilize DCI format 1_0 which contains fields designed to schedule dedicated PDSCH transmissions with HARQ support and flexible modulation. The SI transmissions are broadcast transmissions with no re-transmissions and limited to QPSK. Some of the format 1_0 bits have therefore defined as reserved in cases the PDCCH is scrambled with SI-RNTI. These bits are not thus not used for scheduling the SI PDSCH. One or more of these reserved bits may be used for signaling the SI type.

For a non-limiting example, the bit position used for indicating the paging DCI type (scheduling PDSCH or direct messaging) when the PDCH is scrambled with P-RNTI could be used for the SI type indication when the PDCCH is scrambled with SI-RNTI.

FIG. 1A illustrates DCI fields that may be used to indicate system information (SI) type (e.g., being OSI PDSCH or RMSI PDSCH) per one embodiment of the invention.

Thus, a network node (e.g., a base station, see FIG. 6 and related discussion) may set one or more reserved bits within the DCI to indicate the system information type. The system information type indicates whether the scheduled PDSCH carries RMSI or OSI. The network node then includes the corresponding RMSI and/or OSI using the PDSCH (e.g., the PDSCH in the same subframe). Based on the indicated SI type using the one or more previously reserved bits, the corresponding wireless device (WD) (sometimes referred to as wireless node, and the two terms are used interchangeably) (e.g., UE, see FIG. 6 and related discussion) may receive the PDCCH transmission, decode the PDCCH payload, and check the indicator bit positions and determine the corresponding PDSCH carries RMSI or OSI.

FIG. 1B illustrates the decoding of the DCI fields indicating the SI per one embodiment of the invention. In one embodiment, a wireless node decodes a physical broadcast channel (PBCH) from a signal received by the wireless device (e.g., from a corresponding network node) at reference 122. The wireless node obtains control resource set (CORSET) configuration configured by the PBCH at reference 124. The wireless node then identifies physical uplink control channel (PDCCH) based on the CORESET configuration at reference 126.

At reference 128, the wireless node determines, within the PDCCH, one or more bits of a downlink control information (DCI) that indicates a corresponding physical downlink shared channel (PDSCH) carrying a remaining minimum system information (RMS) or other system information (OSI).

At reference 130, the wireless node decodes the corresponding physical downlink shared channel (PDSCH) carrying the RMSI. The corresponding PDSCH may be in the same subframe as the PDCCH. The decoding of the RMSI causes the wireless node to establish the initial access with the network node. The decoding of the RMSI may involve soft combining as discussed.

Additionally, the wireless node may ignore the corresponding physical downlink shared channel (PDSCH) carrying the OSI since the information is not required until one or more RMSI PDSCHs are decoded successfully.

The Second Set of Embodiments

In current NR specification, both RMSI and OSI are signaled with DCI where the PDCCH is scrambled with the SI-RNTI—a same RNTI value in both cases. In this set of embodiments, the RNTI values for the two SI types are set to be different. For RMSI transmission, the RNTI may be denoted as RMSI-RNTI, SIB1-RNTI, etc. and for OSI transmission, the RNTI may be denoted as OSI-RNTI. The different denotation indicates different values, and/or bit allocations.

One of the two separate RNTIs may be equal to the currently defined SI-RNTI. The RMSI-RNTI and the OSI-RNTI values may be defined in the NR specification, similarly to the present SI-RNTI.

Similar to the SI-RNTI, the new RNTIs are applied to the PDCCH by scrambling the CRC of the coded PDCCH contents with a sequence corresponding to the desired RNTI.

Figure 2A:
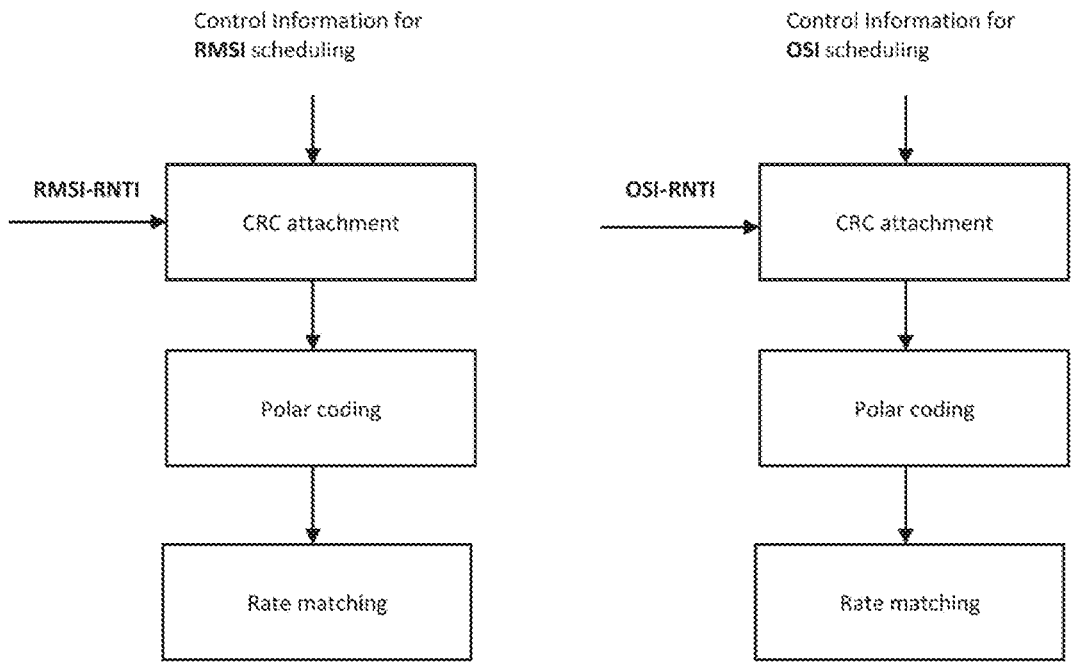
FIG. 2A illustrates different RNTI values used for CRC scrambling of PDCCH scheduling PDSCH carrying RMSI and OSI.

FIG. 2A illustrates different RNTI values are used for CRC scrambling of PDCCH scheduling PDSCH carrying RMSI or OSI.

The wireless node (e.g., UE) aspect of this set of embodiments consists of receiving the PDCCH transmission, decoding the PDCCH payload, computing the CRC, scrambling it with the RMSI-RNTI and OSI-RNTI, and comparing it to the CRC attached to the transmission. If the RMSI-RNTI-scrambled CRC results in a match, the SI transmission is interpreted as RMSI. Otherwise, if the OSI-RNTI-scrambled CRC results in a match, the SI transmission is interpreted as OSI.

Figure 2B:
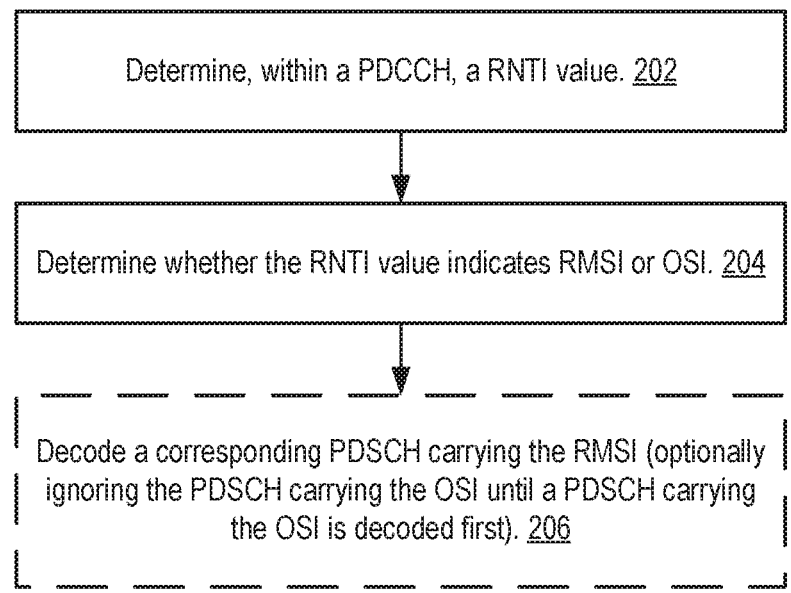
FIG. 2B illustrates a method for decoding PDSCH based on RNTI according to some embodiments.

FIG. 2B illustrates a method for decoding PDSCH based on RNTI per one embodiment of the invention. At reference 202, a wireless node determines within a PDCCH, a RNTI value. The determination may include receiving the PDCCH transmission, decoding the PDCCH payload, computing the CRC, scrambling it with the RMSI-RNTI and OSI-RNTI, and comparing it to the CRC attached to the transmission.

At reference 204, the wireless node determines whether the RNTI value indicates RMSI or OSI. In one embodiment, if the RMSI-RNTI-scrambled CRC results in a match, the SI transmission is interpreted as RMSI. Otherwise, If the OSI-RNTI-scrambled CRC results in a match, the SI transmission is interpreted as OSI.

At reference 206, optionally, the wireless node decodes a corresponding PDSCH carrying the RMSI.

The Third Set of Embodiments

In this set of embodiments, SI indicator may alternatively be enclosed in the SI payload in the PDSCH. Its bit position in the PDSCH payload is the same in both RMSI and OSI. FIG. 3 illustrates a SI payload in a PDSCH per one embodiment of the invention.

Figure 3A:
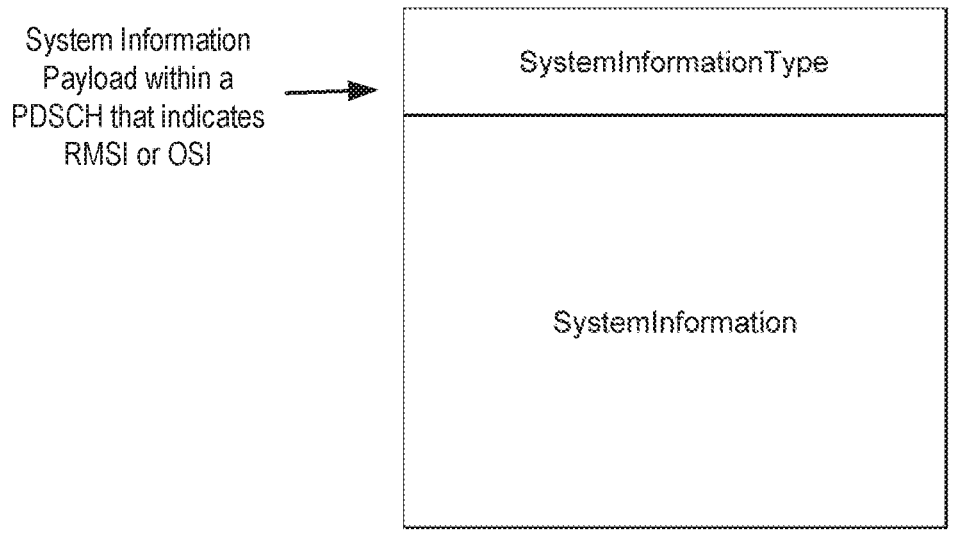
FIG. 3A illustrates information of system information type as SI payload in PDSCH according to some embodiments.

FIG. 3A illustrates that the system information type indicates that the SI payload in the PDSCH is for RMSI or OSI. The system information type information may be embedded into bit fields ahead of the system information, so that the wireless device knows the SI payload type by decoding the system information type and then it decides whether to decode the system information (e.g., decoding when it's for RMSI and/or ignoring if it's for OSI).

The wireless node (e.g., UE) aspect of this set of embodiments consists of receiving the PDCCH transmission scrambled with SI-RNTI, receiving the PDSCH scheduled by the DCI, decoding the payload, and extracting the indicator bits in the predetermined position(s).

Figure 3B:
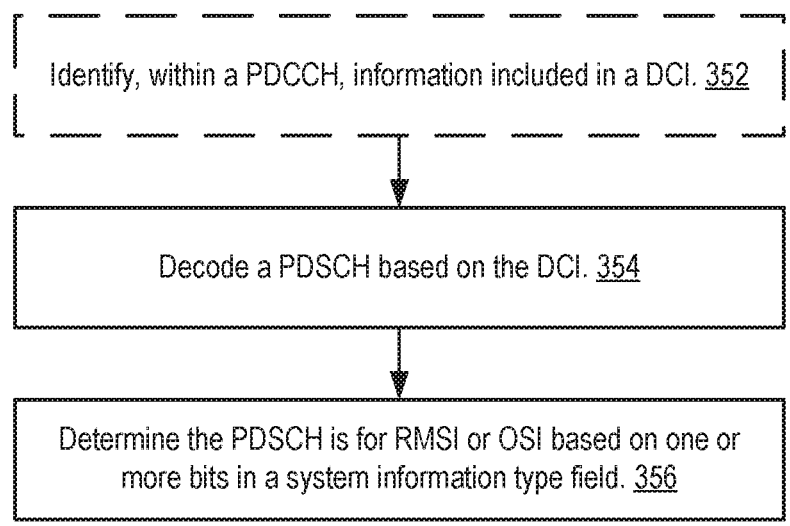
FIG. 3B illustrates a method for decoding PDSCH based on system information type according to some embodiments.

FIG. 3B illustrates a method for decoding PDSCH based on system information type per one embodiment of the invention. At reference 352, a wireless node identifies, within a PDCCH, information included in DCI. In one embodiment, the identification includes receiving the PDCCH transmission scrambled with SI-RNTI.

At reference 354, the wireless node decodes a PDSCH based on the DCI. In one embodiment, the wireless node receives the PDSCH scheduled by the DCI, decoding the payload, and extracting the indicator bits in the predetermined position(s).

At reference 356, the wireless node determines the PDSCH is for RMSI or OSI based on one or more bits in a system information type field. The one or more indication bits indicates type of the system information to be carried on the PDSCH is RMSI or OSI.

Based on the determination, the wireless node may determine the system information (SI) is for RMSI or OSI. When the SI is for RMSI, the wireless node performs initial access procedures as discussed.

The Fourth Set of Embodiments

In this set of embodiments, an additional CORESET for PDCCH scheduling OSI is defined, and the additional CORESET is different from the CORESET for PDCCH scheduling RMSI. This additional CORESET can be configured by RMSI.

The CORESETs of RMSI and OSI are defined as distinct and non-overlapping. The RMSI CORESET is provided in the MIB (PBCH), and in that CORESET, OSI is not scheduled. Soft combining of RMSI can thus be performed unambiguously, including for PDCCH if necessary. OSI CORESET will be provided in the RMSI and it is guaranteed to be distinct from the RMSI CORESET.

Note that this set of embodiments differs from the current NR specification in that the OSI CORESET is always provided in this set of embodiments. In the current NR specification, providing the separate OSI CORESET in the RMSI is optional.

The wireless node (e.g., UE) aspect of this set of embodiments consists of receiving the RMSI using the RMSI CORESET, including optional soft combining. Then the wireless node obtains the OSI CORESET information from the RMSI. The wireless node then receives the OSI using the OSI CORESET. In this case, using an OSI CORESET means to use the DCI scheduling information in the OSI CORESET for the corresponding PDSCH carrying the OSI.

Alternatively, in some cases, a similar effect may be achieved by defining different, non-overlapping search spaces for RMSI and OSI with the same CORESET.

Figure 4A:
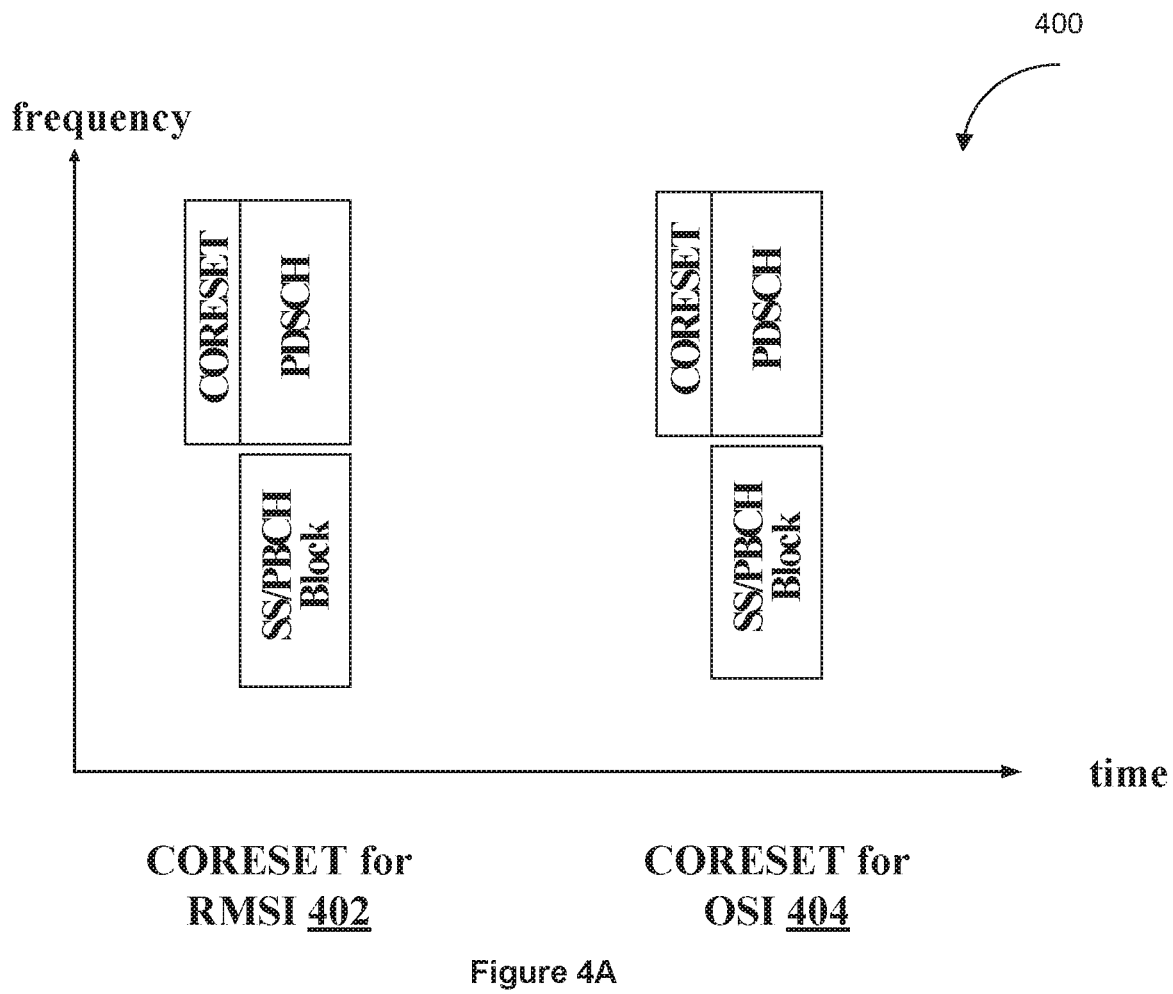
FIG. 4A illustrates that distinct CORESETs are configured for RMSI and OSI according to some embodiments.

FIG. 4A illustrates that the distinct CORESETS are configured for RMSI and OSI. For example, the CORESET for RMSI at reference 402 is distinct from and non-overlapping with (in time and frequency domains) the CORESET for OSI at reference 404. Note that while FIG. 4 illustrates other types of configuration about SS/PBCH, PDSCH and CORESET, other types of configurations are feasible. Embodiments of the invention apply along as the CORESETs of RMSI and OSI are defined as distinct and non-overlapping.

Figure 4B:
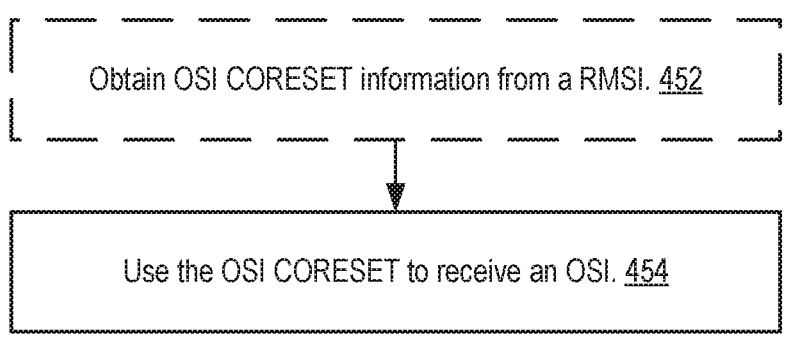
FIG. 4B illustrates use of distinct CORESET for RMSI and OSI according to some embodiments.

FIG. 4B illustrates the use of distinct CORESET for RMSI and OSI. At reference 452, a wireless node obtains OSI CORESET information from a RMSI. In one embodiment, the RMSI is received from RMSI CORESET, where optionally soft combining is performed. In the RMSI CORESET, OSI is not scheduled.

At reference 454, the wireless node uses the OSI CORESET to receive an OSI, which may aid the wireless node in initial access.

The Fifth Set of Embodiments

Figure 5A:
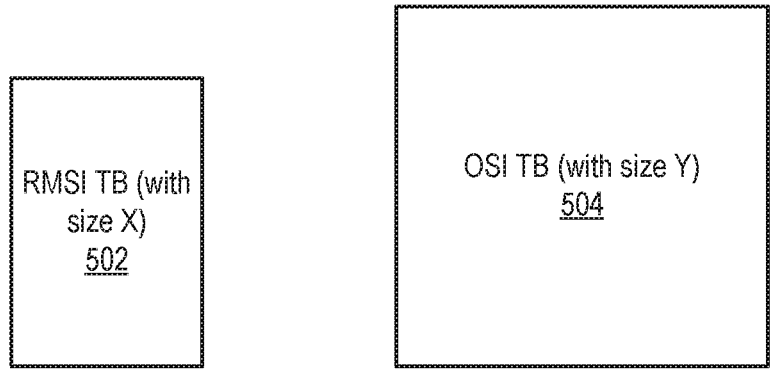
FIG. 5A illustrates different transport block (TB) sizes of an RMSI and an OSI according to some embodiments.

In this set of embodiments, a network node may schedule a different transport block (TB) size (FIG. 5A) or coding scheme for OSI and RMSI to make sure that the number of soft bits is different for RMSI and OSI, and consequently a wireless node (e.g., UE) will not soft combine an OSI and an RMSI. This would help the wireless node to avoid soft combining OSI and RMSI when they have a same number of soft bits before decoding and the wireless node can't identify the RMSI as a result. FIG. 5A illustrates that RMSI TB has a size of X blocks (which uses a time period and a frequency band), while OSI TB for the same time period and frequency band having a size of Y blocks.

Figure 5B:
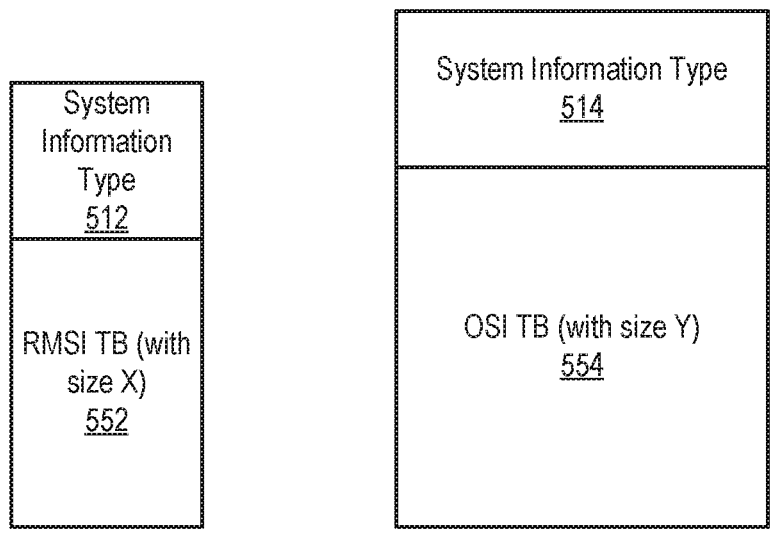
FIG. 5B illustrates RMSI and OSI differentiation by TB size as well as system information type according to some embodiments.

Additionally, if the wireless node needs to know whether a TB is for RMSI or OSI, this set of embodiments may be used in combination of the third set of embodiments, where system information type is defined in each block. In this way, the wireless node knows whether the TB is for OSI or RMSI. FIG. 5B illustrates the different TB sizes for OSI and RMSI, and the system information types additionally identify which TB size is for RMSI (or OSI).

Figure 6:
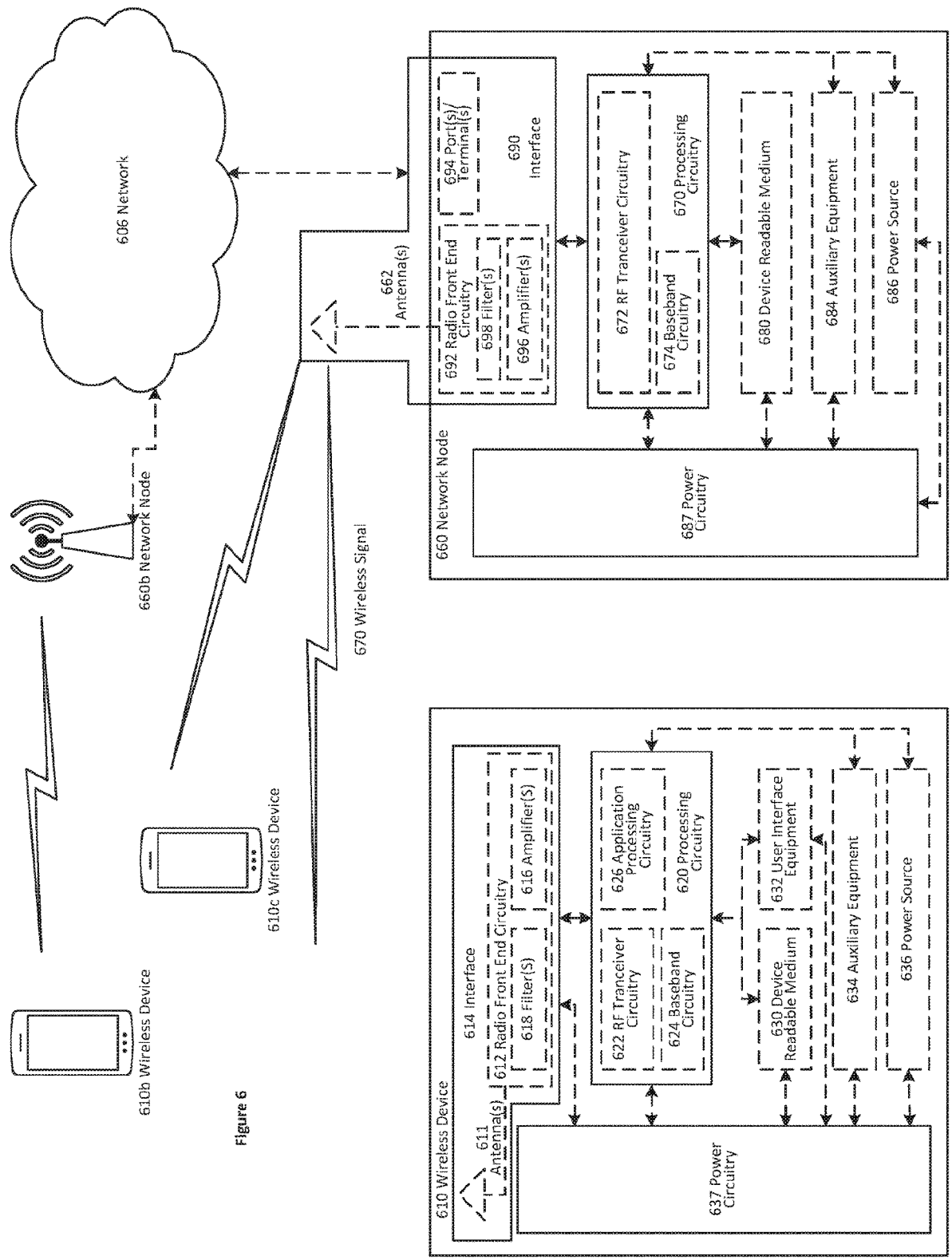
FIG. 6 illustrates a wireless network system in which the disclosure applies.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c*. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signaling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprises one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein.

For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
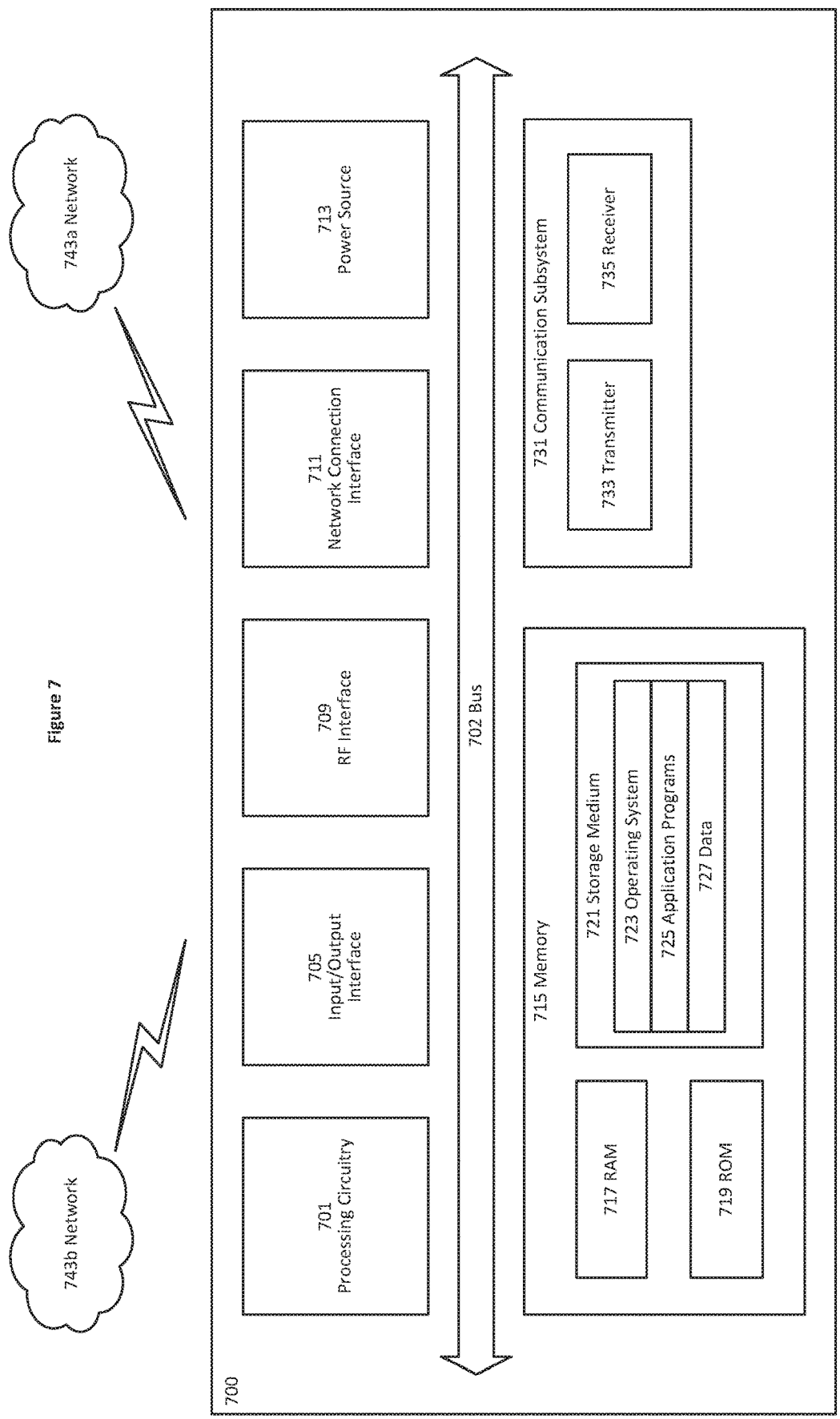
FIG. 7 illustrates an embodiment of a user equipment according the disclosure.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743*a*. Network 743*a* may encompass wired and/or wireless networks such as a local-area network (LAN), a wide-area network (WAN), a computer network, a wireless network, a telecommunications network, another like network or any combination thereof. For example, network 743*a* may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
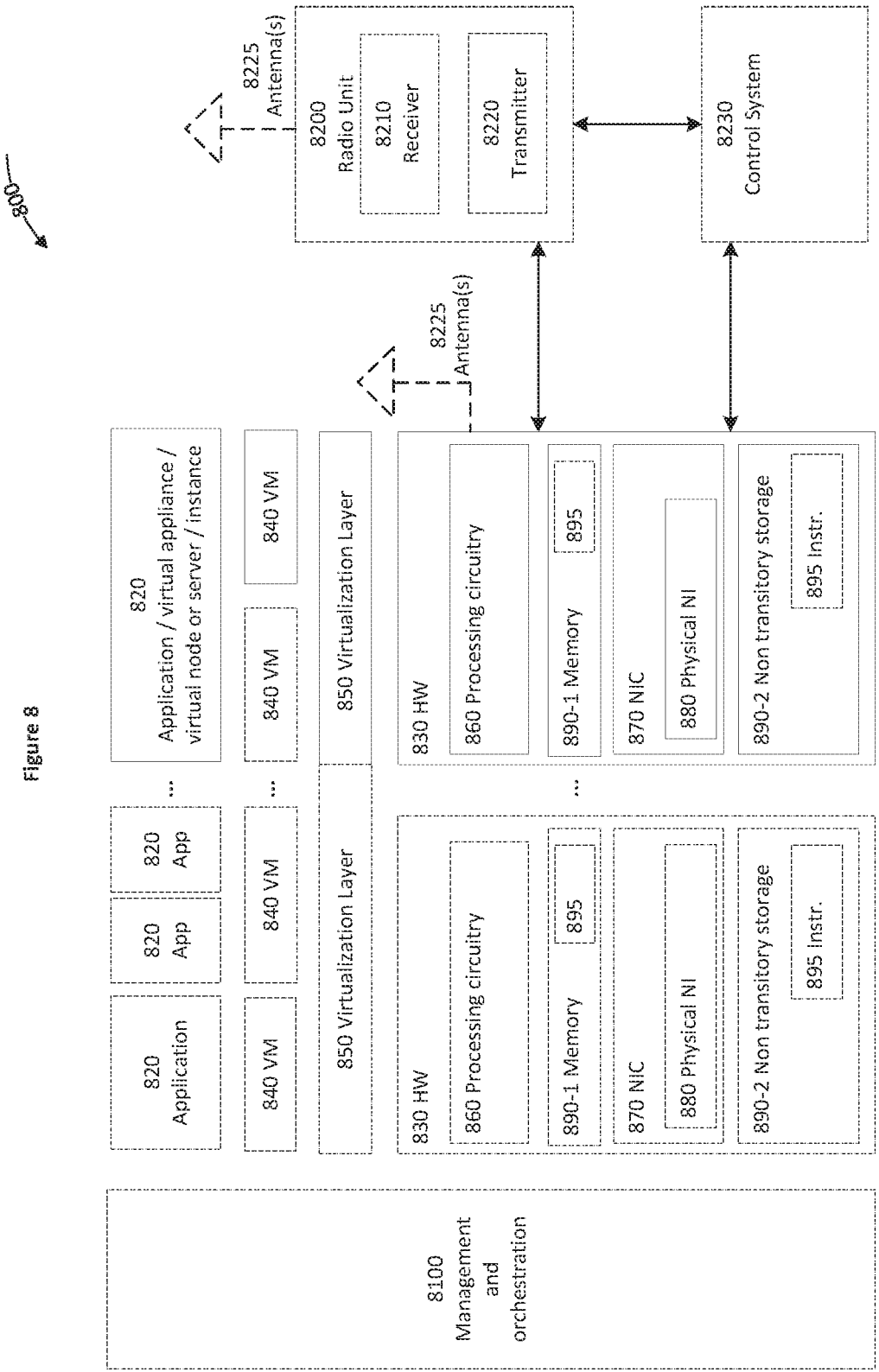
FIG. 8 shows a schematic block diagram of a virtualization environment of some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signaling can be effected with the use of control system 8230 which may alternatively be used for communication between the hardware nodes 830 and radio units 8200.

Figure 9:
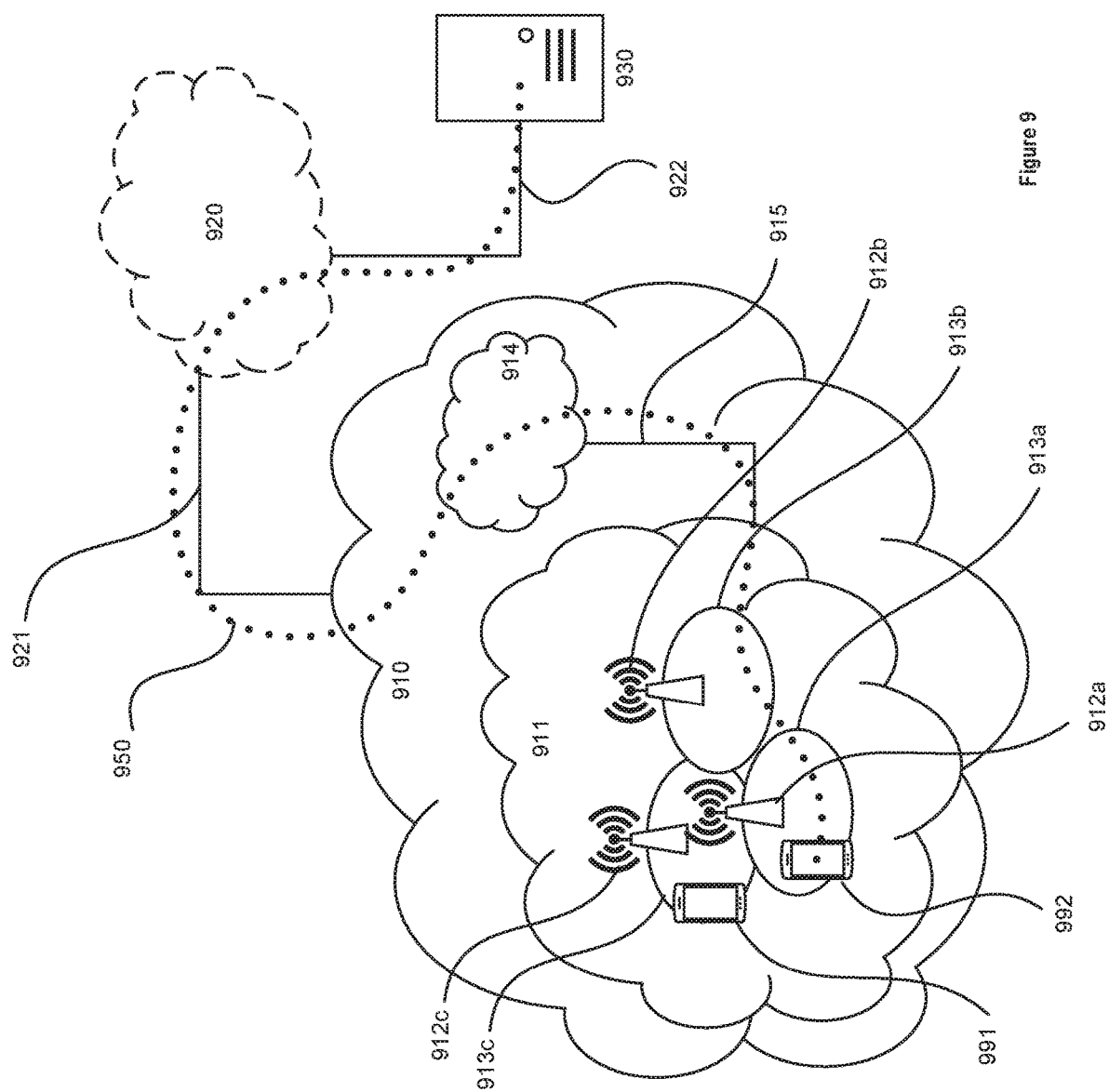
FIG. 9 shows a communication system according to some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10)

served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. The hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
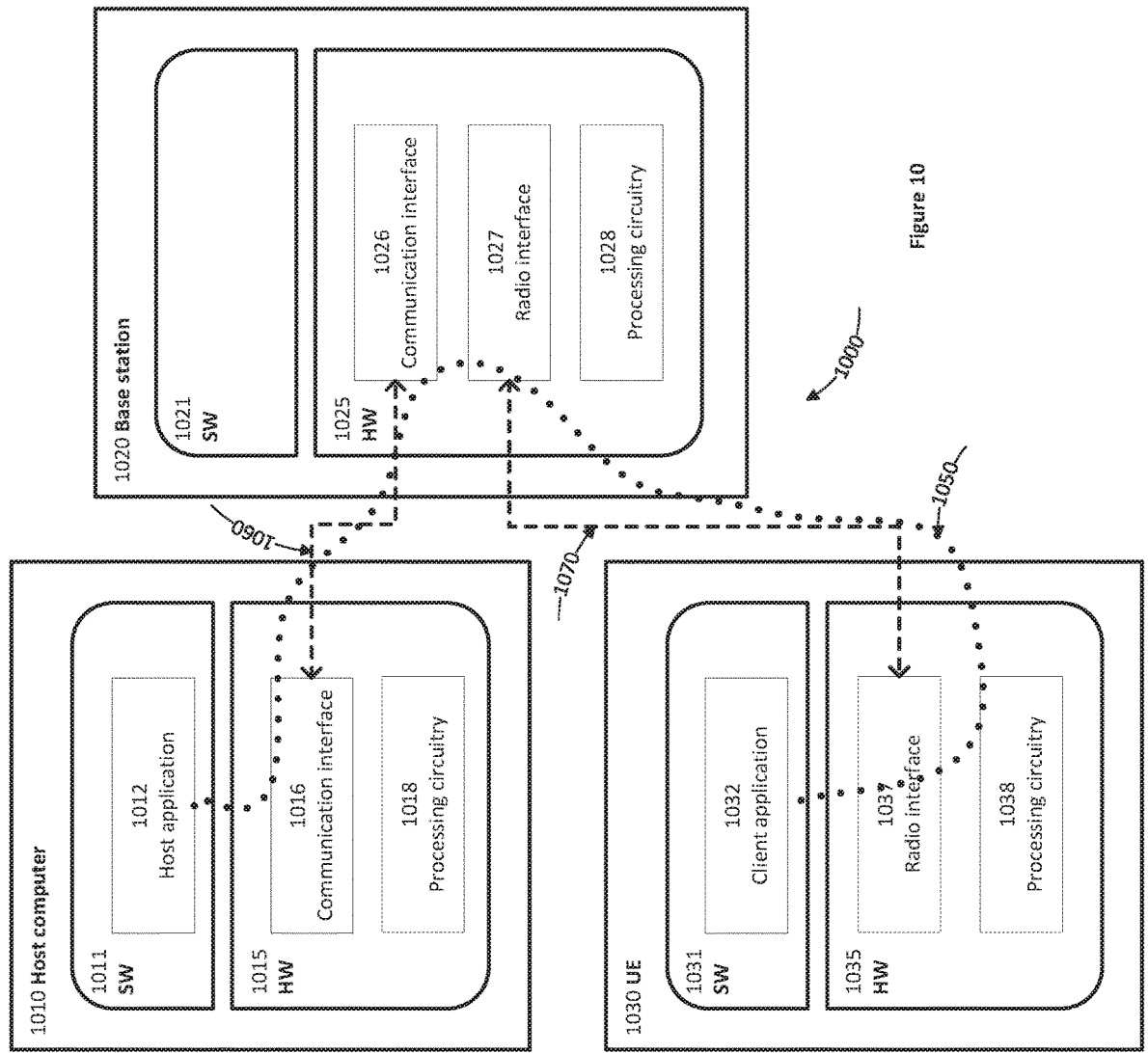
FIG. 10 shows a communication system including host computer according to some embodiments.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
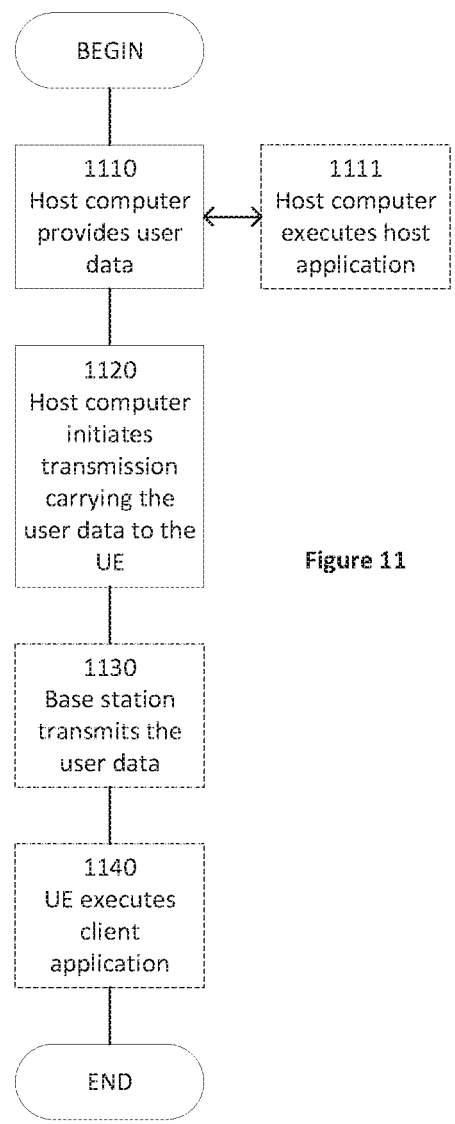
FIG. 11 is a flowchart illustrating a method implemented in a communication system in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
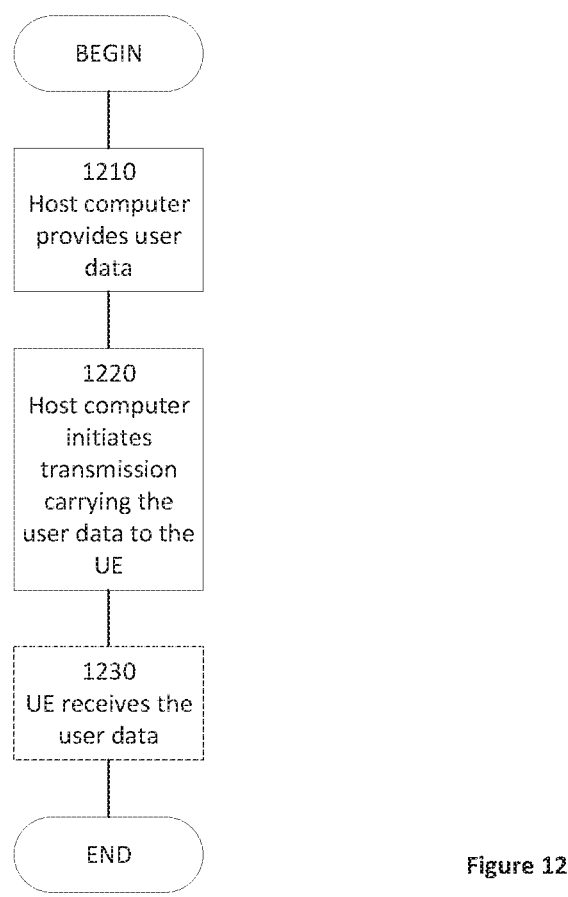
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
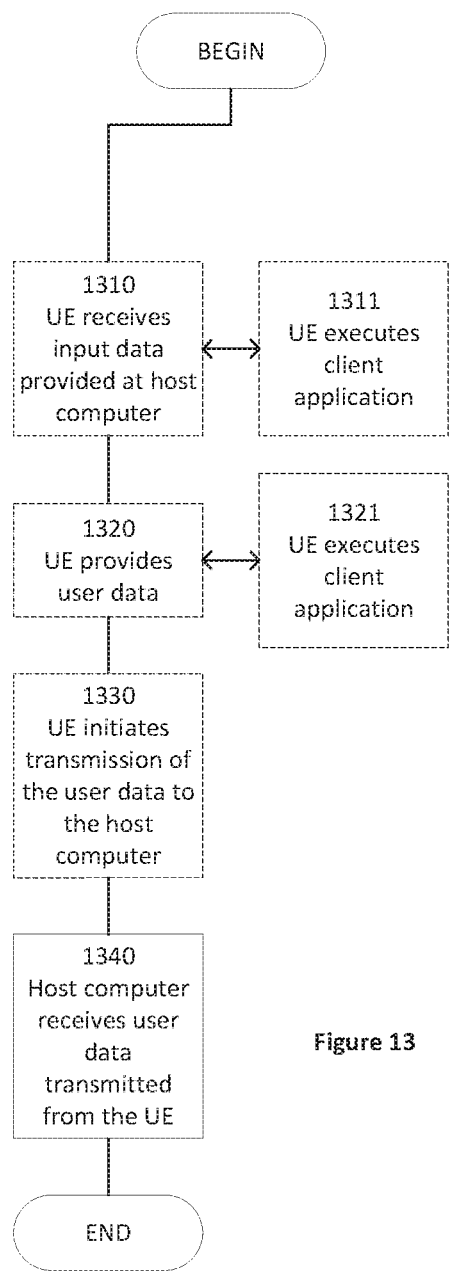
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
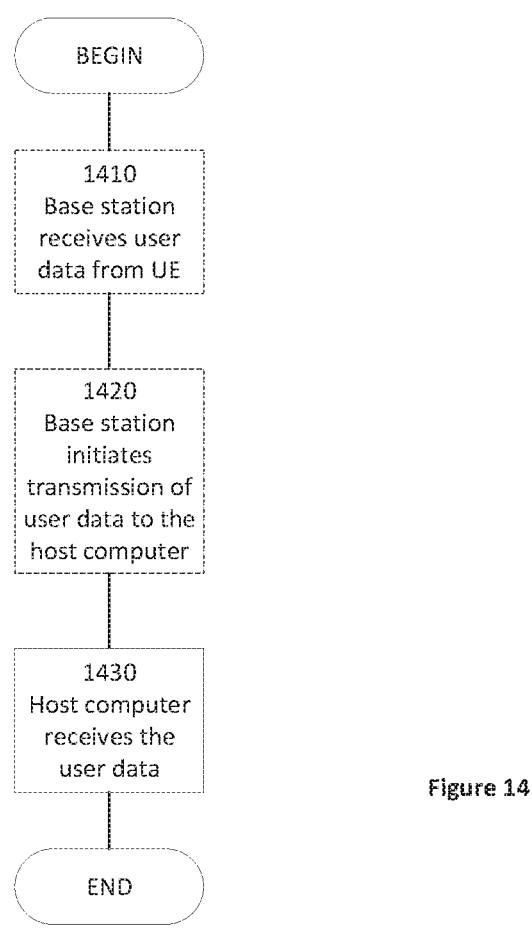
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Abbreviations

At least some of the following abbreviations may be used in this application. If there is an inconsistency between abbreviations, preference should be given to how it is used above. If listed multiple times below, the first listing should be preferred over any subsequent listing(s).
CORESET Control Resource Set
CRC Cyclic Redundancy Check
DCI Downlink Control Information
DMRS Demodulation Reference Signal
FDM Frequency Division Multiplexing
MIB Master Information Block
MSG Message
NR New Radio
OFDM Orthogonal Frequency Division Multiplexing
OS OFDM Symbol
OSI Other System Information
PBCH Physical Broadcast Channel
PDCCH Physical Downlink Control Channel
PDSCH Physical Downlink Shared Channel
RMSI Remaining Minimum System Information
RNTI Radio Network Temporary Identifier
RV Redundancy Version
SCS Subcarrier Spacing
SIB System Information Block
SSB Synchronization Signal Block, also known as SS/PBCH block
SS/PBCH Synchronization Signal and PBCH (including DMRS of PBCH)
TB Transport Block

The invention claimed is:

1. A method at a wireless device for communication, the method comprising:
   identifying a physical downlink control channel (PDCCH) according to an obtained control resource set (CORESET) configuration;
   receiving a downlink control information (DCI) message on the identified PDCCH;
   determining, from the received DCI message, a scheduled physical downlink shared channel (PDSCH) on which system information is to be carried;
   receiving the scheduled PDSCH carrying the system information, wherein a system information indicator is enclosed in a PDSCH payload for the system information; and
   identifying, from the system information indicator, a type of the system information to be carried on the PDSCH is remaining minimum system information (RMSI) or other system information (OSI).

2. The method of claim 1, further comprising:
   decoding a physical broadcast channel (PBCH) from a signal received from a network node; and
   obtaining the CORESET configuration configured by the PBCH.

3. The method of claim 1, further comprising:
   in response to that the system information is RMSI, decoding the RMSI;
   in response to that there had been decoded RMSI in the wireless device, performing soft combining of RMSI; and
   establishing initial access with a network node from where the system information is obtained, based on the soft combined RMSI.

4. The method of claim 1, further comprising:
   in response to that the system information is OSI, using the OSI in initial access to a network node from where the CORESET configuration is obtained, when an RMSI had been decoded.

5. The method of claim 1, wherein the received DCI message is using DCI format 1_0.

6. A method at a network node for communication, the method comprising:
   broadcasting a control resource set (CORESET) configuration in which a physical downlink control channel (PDCCH) is indicated;
   transmitting a downlink control information (DCI) message on the PDCCH, wherein the DCI message comprising scheduling information for a physical downlink shared channel (PDSCH) carrying system information, and one or more bits indicating a type of the system information to be carried on the PDSCH is remaining minimum system information (RMSI) or other system information (OSI);

transmitting the system information on the scheduled PDSCH, wherein a system information indicator is enclosed in a PDSCH payload for the system information; and scheduling transport block (TB) size for the system information transmission to be carried on PDSCH, wherein TB size of RMSI is different from TB size of OSI.

7. The method of claim 6, wherein transmitting the DCI message on the PDCCH comprises:

transmitting the DCI message comprising scheduling information for the PDSCH under DCI format 1_0.

8. A wireless device, comprising:

an antenna configured for wireless communication;

a processing circuitry; and a device readable medium including instructions which, when executed by the processing circuitry, cause the wireless device to:

identify a physical downlink control channel (PDCCH) according to an obtained control resource set (CORESET) configuration;

receiving a downlink control information (DCI) message on the identified PDCCH;

determine, from the received DCI message, a scheduled physical downlink shared channel (PDSCH) on which system information is to be carried;

receive the scheduled PDSCH carrying the system information, wherein a system information indicator is enclosed in a PDSCH payload for the system information; and identify, from the system information indicator, a type of the system information to be carried on the PDSCH is remaining minimum system information (RMSI) or other system information (OSI).

9. The wireless device of claim 8, wherein the device readable medium further includes instructions which, when executed by the processing circuitry, cause the wireless device to:

decode a physical broadcast channel (PBCH) from a signal received from a network node; and obtain the CORESET configuration configured by the PBCH.

10. The wireless device of claim 8, wherein the device readable medium further includes instructions which, when executed by the processing circuitry, cause the wireless device to:

in response to that the system information is RMSI, decode the RMSI;

in response to that there had been decoded RMSI in the wireless device, perform soft combining of RMSI; and establish initial access with a network node from where the system information is obtained, based on the soft combined RMSI.

11. The wireless device of claim 8, wherein the device readable medium further includes instructions which, when executed by the processing circuitry, cause the wireless device to:

in response to that the system information is RMSI, decode the RMSI; and in response to that there had not been decoded RMSI in the wireless device, store the decoded RMSI in the wireless device.

12. A network node, comprising:

an interface configured for wireless communication;

a processing circuitry, and a device readable medium including instructions which, when executed by the processing circuitry, cause the network node to:

broadcast a control resource set (CORESET) configuration in which a physical downlink control channel (PDCCH) is indicated;

transmit a downlink control information (DCI) message on the PDCCH, wherein the DCI message comprising scheduling information for a physical downlink shared channel (PDSCH) carrying system information, and one or more bits indicating a type of the system information to be carried on the PDSCH is remaining minimum system information (RMSI) or other system information (OSI);

transmit the system information on the scheduled PDSCH, wherein a system information indicator is enclosed in a PDSCH payload for the system information; and schedule transport block (TB) size for the system information transmission to be carried on PDSCH, wherein TB size of RMSI is different from TB size of OSI.

13. The network node of claim 12, wherein the device readable medium including instructions which, when executed by the processing circuitry, cause the network node to transmit the DCI message comprising scheduling information for the PDSCH under DCI format 1_0.

* * * * *